United States Patent [19]

Wilson

[11] Patent Number: 4,666,466
[45] Date of Patent: May 19, 1987

[54] ABRASIVE COMPACTS

[76] Inventor: William I. Wilson, Wallnook House, Langley Park, County Durham, England

[21] Appl. No.: 722,438

[22] Filed: Apr. 15, 1985

Related U.S. Application Data

[63] Continuation of Ser. No. 291,080, Aug. 7, 1981, abandoned, which is a continuation of Ser. No. 131,391, Mar. 17, 1980, abandoned.

[30] Foreign Application Priority Data

Mar. 19, 1979 [ZA] South Africa ............... 79/1278

[51] Int. Cl.$^4$ .............................................. B24D 3/02
[52] U.S. Cl. ......................................... 51/307; 51/295
[58] Field of Search .................................. 51/295, 307

[56] References Cited

U.S. PATENT DOCUMENTS

| | | | |
|---|---|---|---|
| 3,743,489 | 7/1973 | Wentrof, Jr. et al. | 51/307 |
| 3,850,590 | 11/1974 | Chalkley | 51/298 |
| 3,944,398 | 3/1976 | Bell | 51/307 |
| 4,110,084 | 8/1978 | Lee et al. | 51/307 |
| 4,215,999 | 8/1980 | Phaal | 51/307 |
| 4,219,339 | 8/1980 | Wilson | 51/307 |

FOREIGN PATENT DOCUMENTS 742324 5/1953 United Kingdom .
1456817 11/1976 United Kingdom .
1513990 6/1978 United Kingdom .

OTHER PUBLICATIONS

Chemical Abstracts, vol. 90, No. 20, 14 May 1979, Ref. No. 156011y, p. 233, Columbus, Ohio (US) & JP-A-78 136 015 (Sumitomo Electric Industries, Ltd.) (28.11.1978).

Chemical Abstracts, vol. 84, No. 26, 28 June 1976, Ref. No. 184129n, p. 254–Columbus, Ohio (US) & JP-A-76 04 207 (National Institute For Research in Inorganic Materials) (14.01.1976).

Primary Examiner—Paul Lieberman
Assistant Examiner—Willie J. Thompson
Attorney, Agent, or Firm—Cushman, Darby & Cushman

[57] ABSTRACT

An abrasive compact is provided comprising a mass of cubic boron nitride particles and a second phase bonded into a hard conglomerate; adjacent cubic boron nitride particles being joined to each other to form an intergrown mass; the cubic boron nitride content of the compact being at least 80 percent by weight; and the second phase consisting essentially of aluminum nitride and/or aluminum diboride. The compacts are made by subjecting a mass of cubic boron nitride particles in contact with aluminum to a pressure of 50 to 65 kilobars and a temperature of 1400° C. to 1600° C. and maintaining these elevated conditions for a time sufficient to produce the compact.

5 Claims, 1 Drawing Figure

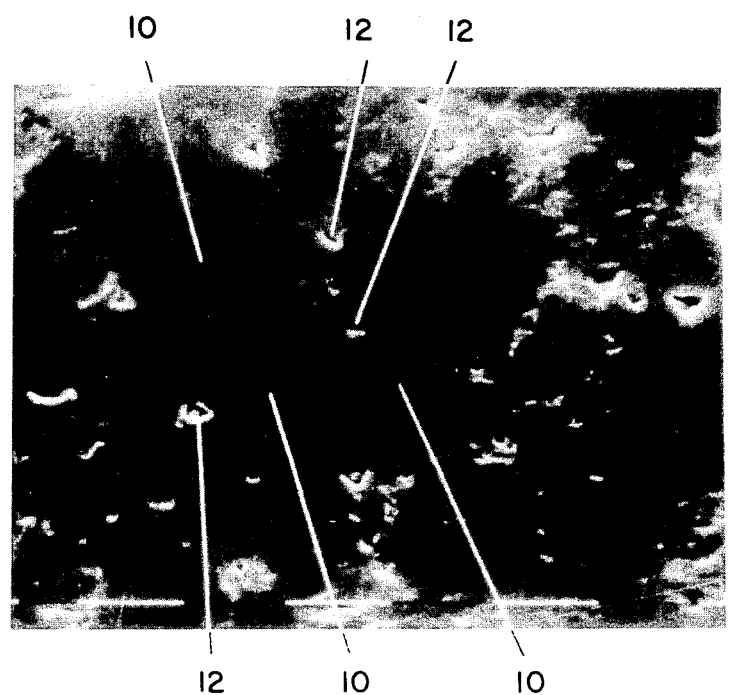

ABRASIVE COMPACTS

This is a continuation of application Ser. No. 291,080, filed 8-7-81, which was abandoned upon the filing hereof, which is a continuation of application Ser. No. 131,391, filed Mar. 17, 1980, now abandoned.

This invention relates to abrasive compacts and more particularly to cubic boron nitride (CBN) compacts.

CBN compacts consist of a mass of CBN particles bonded into a hard conglomerate. Such compacts generally have a second or bonding phase when the CBN content is generally at least 70 percent by volume.

U.S. Pat. No. 3,743,489 describes a cubic boron nitride compact bonded to a cemented carbide backing. The compact comprises a mass of cubic boron nitride crystals and a metallic second phase containing aluminium atoms and atoms of at least one alloying element selected from the group consisting of nickel, cobalt, manganese, iron, vanadium and chromium, the total of the atoms of aluminium and alloying element being in excess of 1 percent by weight of the cubic boron nitride present.

U.S. Pat. No. 3,944,398 describes a cubic boron nitride compact wherein the second or bonding phase comprises aluminium or an aluminium alloy and a ceramic such as silicon nitride. During compact manufacture there is interaction between the aluminium or aluminium alloy and the ceramic resulting in a hard material being produced.

U.S. Pat. No. 4,110,084 describes a process of making an abrasive composite comprising CBN crystals, aluminium or aluminium alloy and a silicon carbide ceramic substrate. The composite is made under relatively mild pressure conditions which are such that intergrowth between adjacent CBN crystals is not possible. British patent specification No. 1,513,990 describes the manufacture of a superhard material which comprises a solid solution of an alloying additive in close-packed modification of boron nitride wherein the alloying additive is at least one element of the 3rd Group of the Periodic Table or a boride thereof, which is capable of forming tetrahedral bonds, the composition having the following composition, atomic percent:
 boron, from 42 to 61
 nitrogen, from 39 to 50
 alloying additive, from 0,04 to 30
 impurities, from 0,01 to 2

The material is thus a solid solution and not a mass of CBN particles having a second or bonding phase. The material is made by subjecting an appropriate mixture of hexagonal or wurzite-like boron nitride and the alloying additive to conditions of elevated temperature and pressure. While the specification states that temperatures of as low as 1500° C. and pressures as low as 50 kilobars will produce the desired hard material, the examples all use considerably more severe conditions. The fact that higher temperatures and pressures are required as a matter of practice is not surprising because such are necessary to convert substantially all the hexagonal boron nitride or wurzite-like boron nitride into the cubic form.

Moreover, the hard material produced by following the teachings of this British specification can be no greater in volume than a few cubic millimeters because of the very severe conditions of manufacture required. Thus, the material may have limited utility as an abrasive particulate material, but cannot have utility as an abrasive compact. Abrasive compacts are large abrasive bodies which are used as such for grinding, turning, cutting and other abrasive operations.

According to the present invention, there is provided an abrasive compact comprising a mass of cubic boron nitride particles and a second phase bonded into a hard conglomerate; adjacent cubic boron nitride particles being joined to each other to form an intergrown mass; the cubic boron nitride content of the compact being at least 80 percent by weight; and the second phase consisting essentially of aluminium nitride and/or diboride.

The second phase (or bonding matrix as it is also referred to) consists essentially of aluminium nitride and/or aluminium diboride. This means that apart from the aluminium nitride and/or aluminium diboride, which are reaction products between the aluminium and the CBN, there are no other essential elements. Any other elements present are present only in trace amounts.

The CBN content of the compact is preferably in the range 85 to 95 percent by weight.

Further according to the invention, there is provided a method of making a cubic boron nitride abrasive compact including the steps of placing a mass of cubic boron nitride particles in contact with a mass of aluminium to form a reaction mass, placing the reaction mass in a reaction zone, raising the pressure of the reaction zone to a pressure in the range 50 to 65 kilobars and the temperature to a temperature in the range 1400° C. to 1600° C., maintaining the elevated conditions of temperature and pressure for a time sufficient to produce an abrasive compact of the reaction mass, and recovering the compact from the reaction zone.

The reaction zone will be that of a conventional high temperature/pressure apparatus. Normally, the reaction mass is placed in a capsule which is placed in the reaction zone and then the elevated conditions of temperature and pressure applied to it.

The elevated conditions of temperature and pressure are usually maintained for a period of at least five minutes to produce the compact. These elevated conditions are generally not maintained for a period longer than 60 minutes because damage to the apparatus may result. In fact, usually a time of less than 30 minutes is used.

Conventional recovery techniques may be used to recover the compacts. For example, where a plurality of compacts is produced in a cylindrical capsule, the capsule is ground or peeled away and then the individual compacts removed therefrom. Suitable screening material is provided between adjacent compacts to prevent them bonding to each other.

The reaction mass will consist only of the CBN particles and aluminium, apart, of course, from trace impurities. The reaction mass preferably comprises the mass of CBN particles in contact with an aluminium layer, which may be in the form of a foil or a powder. In this case, the aluminium infiltrates into the CBN mass during compact manufacture. The reaction mass may also comprise a mixture of the CBN particles and powdered aluminium.

The CBN compact of the invention has been found to have excellent abrasive properties and out-performs other commercially available CBN compacts. The outstanding properties of the compact are believed to be attributable to a number of factors:

The CBN particles undergo plastic deformation during compact manufacture leading to densification of the particles. As mentioned above, the CBN content of the compact is at least 80 percent by weight.

Under the applied temperature and pressure conditions intergrowth between adjacent CBN particles occurs. As a result of this, the particles are fused or joined to their neighbours and a continuous mosaic or intergrown mass develops. The intergrowth is so effective, it has been found, that the fracture path through a compact follows a transgranular and not an intergranular pattern.

The aluminium second phase also plays an important role. In filling the spaces between particles during manufacture it transmits the applied pressure to those CBN surfaces not in contact thereby inhibiting transformation to hexagonal boron nitride. Any such transformation would seriously weaken the compact. The compacts have been found by X-ray analysis to have no detectable, i.e. less than 0,5 percent by weight, hexagonal boron nitride. The aluminium also fulfills the important role of providing a medium in which diffusion of boron and nitrogen can take place and, in so doing, enhances the intergrowth of adjacent particles. Finally, the aluminium reacts with the CBN to form aluminium diboride and aluminium nitride which assists in the binding of the composite.

The compacts of the invention may be large or small, but generally have a volume of at least 40 cubic millimeters. Typically, the volume is in the range of 100 to 1500 cubic millimeters. The compacts may be used as such or they may be mounted on a suitable support such as a tungsten carbide support.

The invention will now be illustrated by the following examples and accompanying FIG. 1 which is a photograph of 2000 magnification of a section of a compact of the invention.

EXAMPLE 1

A mass of CBN particles of size 8 to 20 microns was placed on an aluminium foil to form a starting mass. The mass was placed in a reaction capsule for a conventional high temperature/pressure apparatus. The loaded capsule was placed in the reaction zone of the apparatus. The pressure of the reaction zone was raised to 55 kilobars and the temperature to about 1500° C. These elevated conditions of temperature and pressure were maintained for a period of 15 minutes. The pressure and temperature were allowed to return to ambient conditions and recovered from the capsule in conventional manner was a CBN compact in the form of a disc. The compact was analysed to have a CBN content of 93 percent by weight, the remaining 7 percent by weight being made up of aluminium nitride and aluminium diboride. No detectable hexagonal boron nitride or metallic aluminium was found by X-ray analysis. The volume of the compact was about 750 cubic millimeters.

The compact was fractured and polished and the polished surface examined. Joining between adjacent particles producing an intergrown mass was observed. A photograph of an etched surface is given in the accompanying FIG. 1. The intergrown CBN is 10 while the aluminium containing second phase was in the etched holes 12.

The compact was found to have excellent abrasive properties, even when unbacked, as is illustrated by the data provided hereinafter.

EXAMPLE 2

The method of example 1 was followed except that a mixture of the CBN particles and powdered aluminium was used as the starting mass.

EXAMPLE 3

The method of Example 1 was followed except that the elevated conditions of temperature and pressure were maintained for a period of 10 minutes.

EXAMPLE 4

The method of Example 1 was followed except the elevated temperature applied was about 1450° C. and the elevated pressure applied was 60 kilobars.

EXAMPLE 5

The method of Example 1 was followed except that the elevated temperature applied was 1550° C. and the elevated pressure applied was 55 kilobars.

EXAMPLE 6

The method of Example 1 was followed except the amount of CBN particles and aluminium used in the starting mass was such as to produce a compact having a CBN content of 90 percent by weight, the balance being aluminium nitride and aluminium diboride and trace impurities.

The compacts produced by each of the Examples 2 to 6 were found to have excellent abrasive properties.

EXAMPLE 7

The abrasive properties of the compact produced in Example 1 were compared with those of a commercially available CBN compact and with a compact produced by the method described in U.S. Pat. No. 3,944,398. The commercially available compact was mounted on a cemented carbide support and was a CBN compact containing a cobalt/aluminium second phase. The compact was purchased from the General Electric Company. It is believed that this compact composite was made following the teachings of U.S. Pat. No. 3,743,489

The three compacts were used to machine a D3 hardened steel of Rockwell hardness 54 to 56. The machining was continued in each case until a 0,2 mm flat had been worn on the compact. The time taken to produce this flat for each case was:

| COMPACT | TIME IN MINUTES |
|---|---|
| Example 1 | 9,6 |
| 3,944,398 | 1,6 |
| 3,743,489 | 4,0 |

These results show that the compact produced by Example 1 was more effective than the other two compacts in the machining of the D3 hardened steel.

In the machining of a D3 hardened steel of Rockwell hardness 58 it was found that the compact of the invention had a life of two and a half times that of the 3,743,489 compact.

I claim:

1. An abrasive compact consisting essentially of two phases, the first phase being a mass of cubic boron nitride particles and a second phase bonded into a hard conglomerate; adjacent cubic boron nitride particles being joined to each other to form an intergrown mass;

the cubic boron nitride content of the compact being at least 80 percent by weight; and the second phase consisting essentially of aluminium nitride and/or aluminium diboride and being free of metallic aluminium as detectable by X-ray analysis.

2. An abrasive compact according to claim 1 wherein the cubic boron nitride content of the compact is in the range 85 to 95 percent by weight.

3. An abrasive compact according to claim 1 which has a volume of at least 40 cubic millimeters.

4. An abrasive compact according to claim 1 which has a volume of 100 to 1500 cubic millimeters.

5. An abrasive compact made by heating under pressure a mass which contains only cubic boron nitride particles and aluminum apart from trace impurities, the compact consisting essentially of two phases, the first phase being a mass of cubic boron nitride particles and a second phase bonded into a hard conglomerate, adjacent cubic boron nitride particles being joined to each other to form an intergrowth mass, the cubic boron nitride content of the compact being at least 80 percent by weight, and said second phase consisting essentially of aluminum nitride and/or diboride and being free of metallic aluminum as detectable by X-ray analysis.

* * * * *